March 30, 1954 R. V. REPPERT 2,673,684

DECIMAL POINT MECHANISM

Filed Feb. 27, 1951 3 Sheets-Sheet 1

INVENTOR.
Richard V. Reppert

INVENTOR.

Richard V. Reppert

INVENTOR.

Richard V. Reppert

Patented Mar. 30, 1954 2,673,684

UNITED STATES PATENT OFFICE 2,673,684

DECIMAL POINT MECHANISM

Richard V. Reppert, Rochester, N. Y.

Application February 27, 1951, Serial No. 212,915

6 Claims. (Cl. 235—63)

This invention relates to improvements in decimal point indicating mechanism for calculating machine registers and more particularly for the class of calculating machines in which a product register having denominational numeral dials, adapted to be actuated to show the product of a multiplication, is mounted in a carriage, which is movable step by step, to position the register dials relative to the denominational actuating devices for the register dials, in the course of multiplying operation.

The invention consists of the novel construction and combination of parts as set forth in the appended claims.

The primary object is to provide a decimal point indicating mechanism for the product register dials, which functions automatically to indicate the decimal fraction of the figures representing a product, displayed in the register dials, at the conclusion of a multiplying operation.

A further object is to provide a multiplicand and a multiplier decimal point key, both operable in their proper sequence when operating the digit keys of the machine for multiplying operation.

Another object is to provide means under control of the multiplicand decimal point key, to set a decimal point indicator to indicating position in the product register dials, which thereby indicates the decimal fraction of the multiplicand figure that is being set up on the key board.

Another object is to provide an individual decimal point indicator for each register dial in the carriage and settable from a normally non-indicating position to a position in which it is displayed through an opening in the casing, to thereby indicate the decimal fraction of the figures representing a product.

Another object is to provide a decimal point indicator setting device, adapted to be set from a normally ineffective position to an effective position, to thereby be effective to set a decimal point indicator to visible position, in the course of multiplying operation and simultaneously therewith reset an adjacent decimal point indicator from visible position to an invisible position.

Another object is to provide a key, operable before multiplying operation is initiated, to set the decimal point indicator setting devices in effective position.

Another object is to provide means under control of the multiplier decimal point key to reset to ineffective position the decimal point indicator setting device and also to induce a step movement of the register carriage when the key is operated as the first key of the multiplier factor, to indicate that the multiplier is a decimal quantity.

A still further object is to provide a Clear key, operable upon conclusion of a multiplying operation and having means to reset to invisible position any one of the decimal point indicators, that may have been set to visible position.

Other objects and advantages of the invention will be apparent to those skilled in the art by the following description.

Reference is now made to the accompanying drawings wherein like reference numerals designate like parts and wherein.

The present invention is in the nature of an auxiliary mechanism for calculating machines, such as the commercially well-known Marchant Calculating Machine which is disclosed in U. S. Patent No. 2,320,025, issued on May 25, 1943, to H. T. Avery and as such, is not directly concerned with the devices functioning for calculating purposes, but obviously, can be embodied therein and be coordinated with the functions thereof.

The said calculating machine is provided with the usual denominational rows of multiplicand keys which are operated to set up multiplicand factor devices which control the denominational actuating devices for the register dials. This machine is also provided with a row of multiplier digit keys which are operated to induce multiplying operation and to control the multiplying cycles of the denominational actuating devices for the register dials in accordance with the digit value of a multiplier key; furthermore, to induce a register carriage shift at the end of a digital multiplication.

Figure 1:
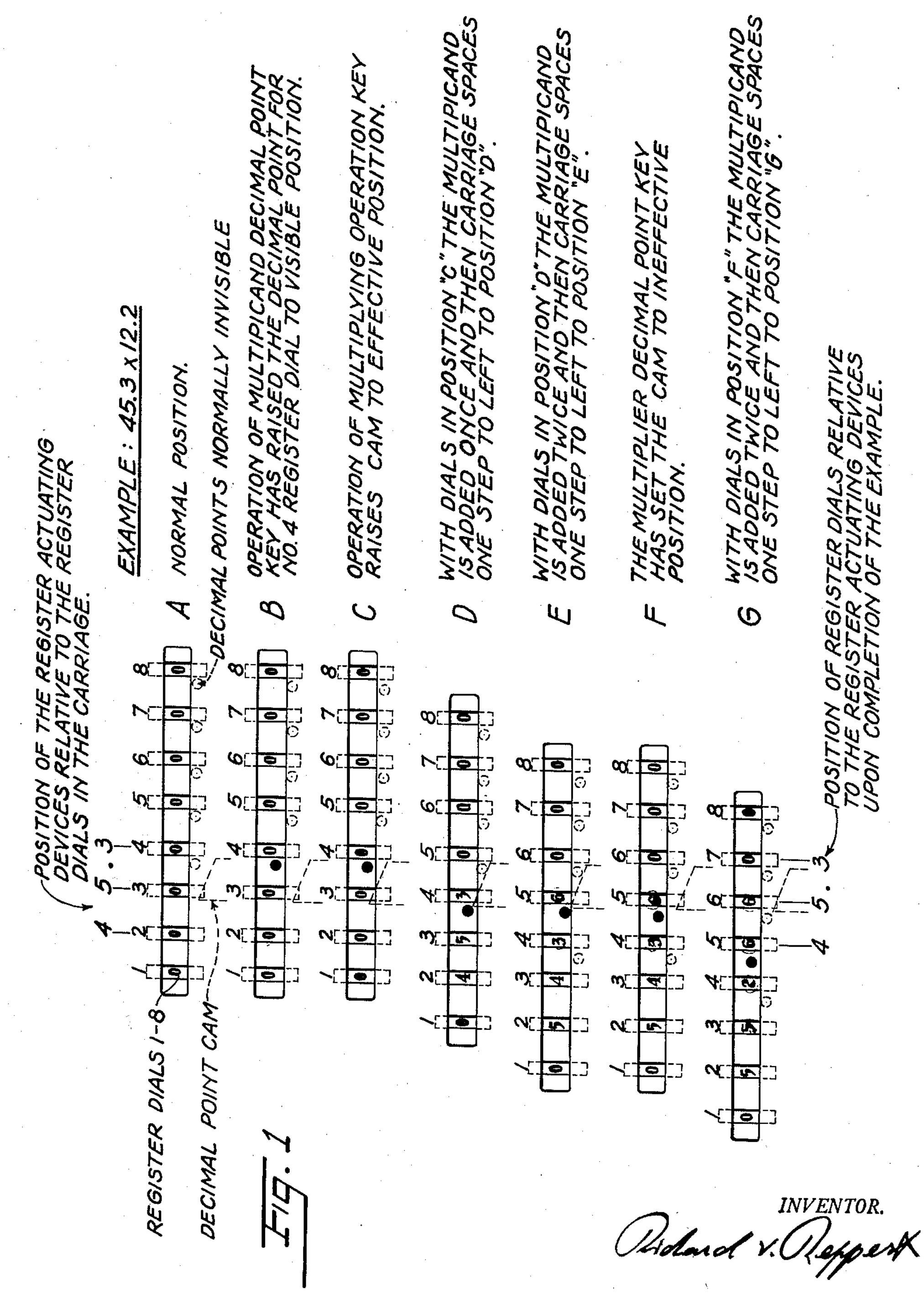
Fig. 1 is a schematic view of the register dials and showing the various positions of the carriage and the decimal point indicating device in the solution of a specific example.

Before describing the mechanism in detail, a brief description of its principle of operation is explained by means of an example. In Fig. 1 a series of register dials are schematically indicated and the letters A, B, C, etc. indicate the various positions they assume in the course of an example in multiplication, during which the register carriage is moved a step, or decimal order, from right to left after each digit multiplication. In position A, a series of dials numbered 1 to 8 are shown and their individual decimal point indicators are indicated as invisible below the opening in the casing.

The multiplicand to be multiplied is 45.3 and the denominational actuating devices for the dials line up with the register dials 2, 3 and 4. As the multiplicand is being set up on the denominational rows of keys, the multiplicand decimal point key is operated in its proper sequence and moves the decimal point indicator for the register dial 4, to indicating position as is shown in position B. After the multiplicand has been set up, the machine is conditioned for multiplying operation by the operation of a key that is operated for this purpose and the operation of this key sets a cam from ineffective to effective position, in which it cams to indicating position a decimal point indicator when the carriage shifts or spaces one step to the left. Position C shows the cam in effective position. The selected multiplier is 12.2 and the operation of the "1" multiplier key induces the actuating devices to multiply the multiplicand 45.3 by 1 and immediately thereafter space the register carriage one step to the left, to thereby position the dials for multiplication by the next digit. The position D shows the position of the dials after multiplication by "1." The register carriage has moved one step to the left and has carried the decimal point indicator for the dial 4 along with it.

The next figure of the multiplier is "2" and the position E shows the position of the register dials after multiplication by "2" and with the register carriage spaced one step to the left. It will be observed that the decimal point indicator for the register dial 4 has been reset to non-indicating position and that the decimal point indicator for the register dial 5 has been raised to indicating position. When the register carriage moved from position D to position E, the decimal point indicator for dial 5 was cammed up by the decimal point cam provided for this purpose: furthermore, means are provided whereby the camming up of one decimal point indicator causes resetting of the left adjacent indicator, so that when the indicator for the dial 5 was cammed up, the indicator for dial 4 was reset to non-indicating position, as is shown.

The next multiplier key to be operated is the decimal point key and the operation of this key resets the decimal point indicator cam. to ineffective position, so that multiplication by further digits will not change the position of the decimal point indicator in the register dials. See position F.

The next multiplier digit is "2" and position G shows the position of the dials upon completion of the multiplication. The multiplicand 45.3 has been added twice to the product as shown in position F and then the register carriage has spaced one more step.

If the multiplier is a decimal quantity such as .2, the multiplier decimal point key is operated first and thereby resets the cam which sets the decimal point indicators to indicating position. As a result, the decimal point indicator for the dial which was set in indicating position when the multiplicand 45.3 was set up, see position B, remains set up, but the operation of the multiplier decimal point key, spaces the register carriage one step to the left and carries the indicating decimal point indicator along, so that the denominational actuating devices will now line up to add the multiplicand 45.3 into the register dials 3, 4 and 5 standing respectively thus: 0.00 and after the multiplicand is added twice the register dials 3, 4 and 5 will show 9.06.

Figure 2:
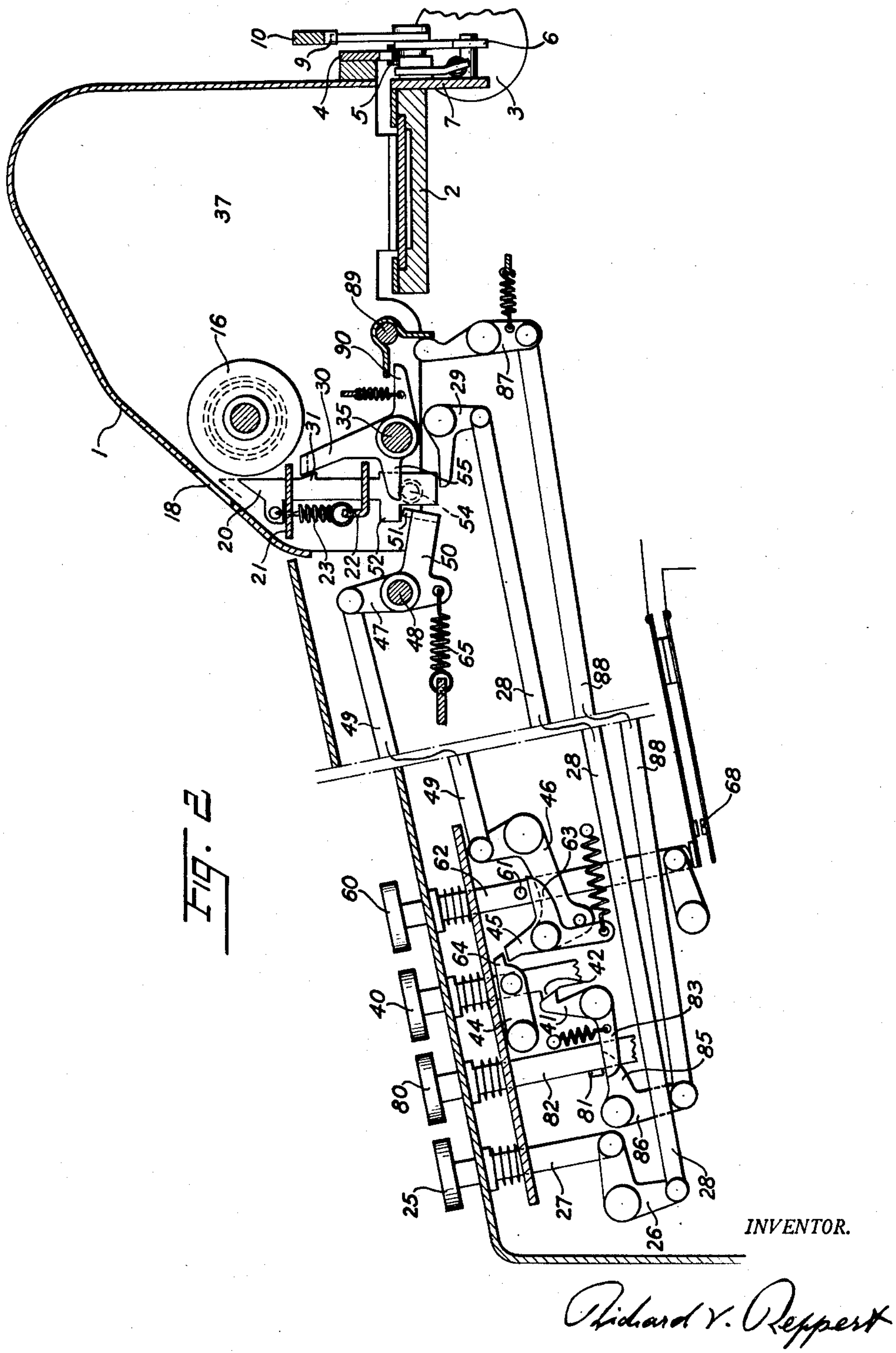
Fig. 2 is a vertical section through a typical calculating machine and showing the decimal point indicating device operating mechanism as associated with the various operating keys.

A register carriage 1, schematically shown in Fig. 2, is slidably mounted on the transverse bracket 2 and is subject to step by step movement, between digital multiplying cycles, by any conventional carriage shift mechanism. These mechanisms are well known in the art, and I have shown a simple mechanism, operable by a solenoid 3 which may be energised in any suitable manner at the termination of a digital multiplication, to shift the carriage to one higher decimal order. A notched bar 4, fastened to the carriage is engaged by a spring held roller 5 to hold the carriage against accidental movement. A plate 6 is slidably mounted on a bracket extension 7 and carries a shift pawl 8, adapted to engage the notched bar 4, but is normally held out of engagement therewith by bearing against a projection 9 on a fixed transverse bar 10. The plate 6 is actuatable, against the tension of a spring 11, by the solenoid 3 which is subject to energisation by a special key, as will be described hereinafter.

Upon actuation of the solenoid, the pawl 8 engages the bar 4 and moves the carriage until stopped by a detent 12 which is positioned to engage the notched bar by a projection 15 on the plate 6.

A series of register numeral dials 16 are mounted on a shaft 17 in the carriage and are subject to rotation by any conventional actuating devices to represent the product of a multiplication. The register casing is provided with an opening 18 aligned with the active numerals on the dials, of which I have shown eight, as being sufficient for illustrating the principle of operation of this invention. For such of the numeral dials as may be used for representing a decimal fraction of a product. a decimal point indicating member 20 is provided and is mounted to the left of the dial to which it refers. These indicating members are slidably mounted on the transverse bars 21 and 22 and are held in normal position by springs 23. The indicators 20 are normally below the line of vision through the casing opening but are subject to upward movement to become visible and thereby assume a decimal point indicating position. An indicating member thus positioned, indicates that the register dials to the right thereof represent the decimal fraction of the product shown on the dials.

The multiplicand key board is provided with a single multiplicand decimal point key 25 which is preferably located to provide four decimal orders for the decimal fractions part of the multiplicand and the multiplicand is entered around this fixed decimal point position.

A bell crank 26 connected to the multiplicand key stem 27 has a link connection 28 with a set lever 29, underlying a decimal point indicating member 20. Upon operation of the key 25 the respective decimal point indicating member is raised and in this position will be locked by a spring held detent 30 engaging a projection 31 on the indicating member.

For each indicating member a detent 30 is provided and is mounted on the transverse shaft 35, extending between the carriage slide plates 36 and 37.

A multiplying operation key 40 is provided and is operables before multiplying operations begin to set the setting device for the decimal point indicating members, in effective position. Upon depression of the key, a spring held detent 41 engages a projection 42 on the key stem and locks the key and the parts actuated thereby, in set position.

A lever 44 is connected to the key stem and extends to overlie a pawl 45 on a bell crank 46 which is connected by a link 49 to a lever 47 on the transverse shaft 48 and holds it in set position.

Figure 4:
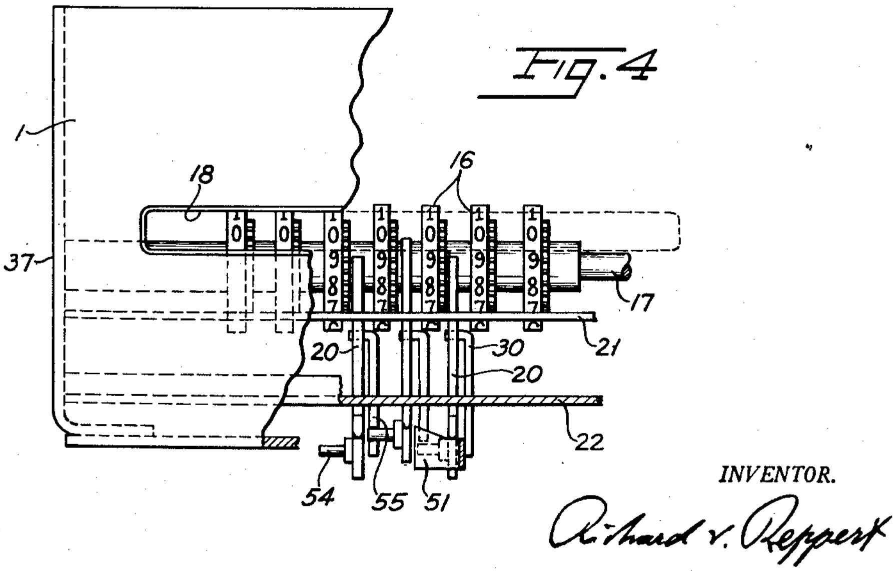
Fig. 4 is a partial front view of the register dials and the decimal point indicating members.

The multiplying operation key 40 is preferably located near the right side of the key board and so is the lever 47 on the transverse shaft 48. On this shaft, but near the center of the key board, a cam lever 50 is mounted and has a lateral offset formed into a cam 51, see Fig. 4, which is positioned between adjacent decimal point indicating members, in such manner that the projection 52 on the indicating members will pass over the cam upon movement of the carriage. The purpose of the cam is to raise or cam up the indicating members in succession, as the carriage shifts, step by step. When the key is operated, the cam is set in effective position and the next shift movement of the carriage will cause the projection 52 on the decimal point indicating member to the right of the cam, to engage the cam and to move the member to indicating position, where it is locked by its detent.

Obviously, only one decimal point indicating member should be in indicating position to indicate the decimal fraction of the figures shown in the register dials and therefore means are provided to reset to non-indicating position all but one of the indicating members.

To accomplish this, every indicating member has a pin 54 extending to the left and underlying the arm 55 of the lock detent 30 for the left adjacent indicating member. Upon setting movement of an indicating member by the cam 51, the pin 54 thereon will actuate the pawl of the left neighbor member and release it for resetting movement.

As explained by the example shown in Fig. 1, position F, the cam 51 which sets the decimal point indicators to indicating position is reset to ineffective position by the operation of a multiplier decimal point key 60, which is operable in its proper sequence when the multiplier keys are operated to induce multiplying operation. As described in said example, the decimal point position for the figures in the product dials is not changed, in the course of multiplying operation, after the decimal point position of the multiplier.

A pin 61 on the key stem 62 of the multiplier decimal point key 60 overlies the arm 63 of the pawl 45 on bell crank 46 which is actuated to set the cam in effective position. Upon operation of the key, the pawl is moved from under the holding extension 64 of the lever 44 and thereby the bell crank 46 and cam 51 are free to reset under the impulse of the spring 65.

Figure 3:
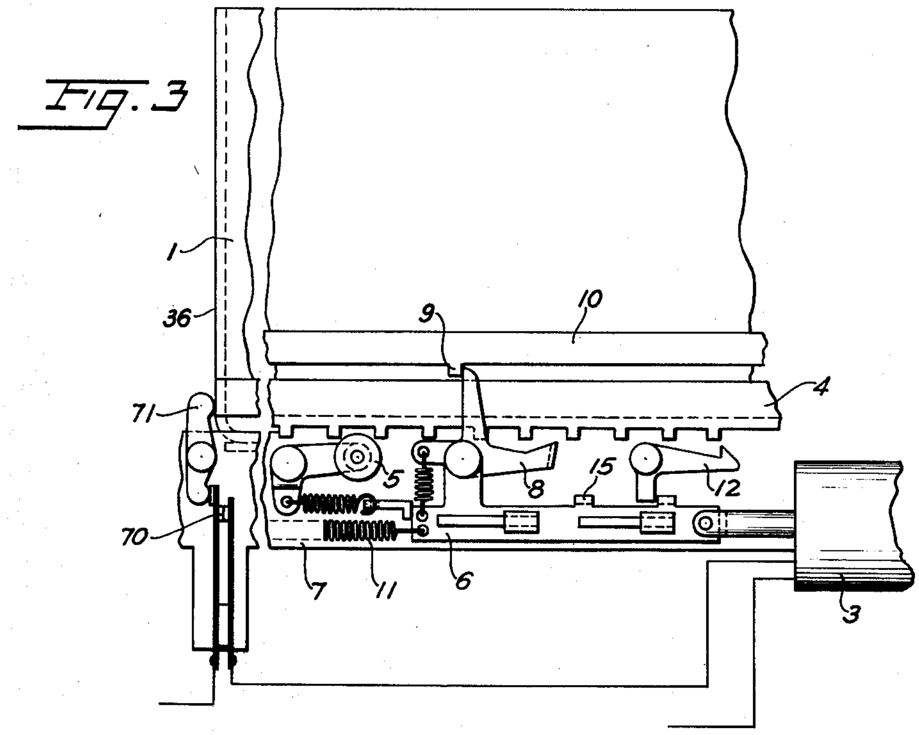
Fig. 3 is a rear view of the carriage and showing the shift mechanism therefor.

The operation of the multiplier decimal point key also induces shift movement of the register carriage, when the key is operated to multiply with a decimal fraction quantity, such as ".2," as explained hereinbefore. The register carriage is always in rightmost position prior to multiplying operation and upon operation of the multiplier decimal point key, the key stem 62 will close a contact 68 to thereby close a circuit which extends to the contact 70, held in closed position by a lever 71, when the register carriage is in normal or starting position. See Fig. 3. The closed circuit extends to the carriage shift solenoid which will operate the shift slide 6, to shift the register carriage. The shift movement of the carriage opens the contact 70 and thereby the circuit, so that operation of the multiplier decimal point key, when multiplying with a mixed quantity, will not shift the register carriage.

Upon completion of a multiplying problem, a clear key 80 is operated to reset the mechanism to normal position. A projection 81 on the stem 82 of the key overlies the arm 83 of the lock detent 41 for the multiplying operation key 40, so that operation of the clear key moves the detent to release the key, to reset.

The same projection 81 on the key stem also overlies the arm 85 of a bell crank 86 which operates a lever 87 by means of a link 88. The upward extending arm of the lever 87 is adapted to actuate a rod 89 mounted in the carriage, by engaging a formed plate member thereon, extending downward and forward. The forward extension of the plate member overlies the rearward extending arms 90 of all of the lock detents 30 for the decimal point indicating members and operation of the clear key 80 will therefore oscillate the rod 89 and release any decimal point indicating member that may be in indicating position.

Having now particularly described my invention, what I desire to secure by Letters Patent of the United States and what I claim is:

1. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, mutiplier keys sequentially operated to control multi-cyclic operation of the actuators followed by operation of the carriage shifting device, the combination of individual decimal point indicators for the register dials settable to indicating position, a multiplicand decimal point key on said key board, means under control of said key to set a decimal point indicator to indicating position, said key and said setting means having a fixed decimal order position relative to the rows of digit keys, thereby establishing definite decimal orders for the rows of digit keys, a setting device for the decimal point indicators, positioned adjacent to the aforesaid setting means, a key to set said setting device from ineffective to effective position in which it functions to set the register decimal point indicators, in succession, to indicating position upon step by step movement of the register carriage, means connected to each of said indicators, effective upon an indicator being set to indicating position to cause resetting of the adjacent indicator to non-indicating position, these means functioning cojointly with the said setting device upon step by step movement of the register carriage, to thereby reset in succession to non-indicating position all but the last set indicator, a single multiplier decimal point key operable in its proper sequence when the multiplier digit keys are operated for multiplying operation and means under control of the multiplier decimal point key to set the setting device for the decimal point indicators, to ineffective position.

2. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, multiplier keys sequentially operated to control multi-cyclic operation of the actuators followed by operation of the carriage shifting device, the combination of individual decimal point indicators for the register dials settable to indicating position, a multiplicand decimal point key on said key board, means under control of said key to set a decimal point indicator to indicating position, said key and said setting means having a fixed decimal order position relative to the rows of digit keys, thereby establishing definite decimal orders for the rows of digit keys, a setting device for the decimal point indicators, positioned adjacent to the aforesaid setting means, means to set said setting device from ineffective to effective position in which it functions to set the register decimal point indicators, in succession, to indicating position upon step by step movement of the register carriage, means connected to each of said indicators, effective upon an indicator being set to indicating position to cause resetting of the adjacent indicator to non-indicating position, these means functioning cojointly with the said setting device upon step by step movement of the register carriage, to thereby reset in succession to non-indicating position all but the last set indicator, a single multiplier decimal point key operable in its proper sequence when the multiplier digit keys are operated for multiplying operation, means under control of the multiplier decimal point key to set the setting device for the decimal point indicators, to ineffective position, and means under control of the multiplier decimal point key to induce a one step movement of the register carriage when the carriage is in its normal right most position.

3. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, multiplier keys sequentially operated to control multi-cyclic operation of the actuators followed by operation of the carriage shifting device; the combination of individual decimal point indicators for the register dials settable to indicating position, a cam member settable to an effective position in which it sets the decimal point indicators to indicating position, upon step by step movement of the register carriage, said cam member having a fixed position relative to the rows of digit keys, thereby establishing decimal order values to the rows of keys, means effective upon an indicator being set to indicating position, to reset to non-indicating position the indicator of adjacent decimal order, a key to set the cam member in position, a single multiplier decimal point key operable in its proper sequence when the multiplier keys are operated for multiplying operation and means under control of the multiplier decimal point key to reset the cam member to ineffective position.

4. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, multiplier keys sequentially operated to control multi-cyclic operation of the actuators followed by operation of the carriage shifting device; the combination of individual decimal point indicators for the register dials settable to indicating position, a setting device settable to an effective position in which it sets the decimal point indicators to indicating position, upon step by step movement of the register carriage, said setting device having a fixed position relative to the rows of digit keys thereby establishing decimal order values to the rows of keys, means effective upon an indicator being set to indicating position, to reset to non-indicating position the indicator of adjacent decimal order, a key to set the setting device member in position, a single multiplier decimal point key operable in its proper sequence when the multiplier keys are operated for multiplying operation and means under control of the multiplier decimal point key to reset the setting device to ineffective position.

5. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, multiplier keys sequentially operated to control multi-cyclic operation of the actuators followed by operation of the carriage shifting device; the combination of a series of individual decimal point indicators for the register dials settable to indicating position, a setting device for the indicators, normally in ineffective position and settable to effective position, a key operable to set the setting device in effective position, means to lock said setting device in effective position, a clear key operable upon conclusion of a multiplying operation, to unlock said setting device and means under control of said key to reset to non-indicating position any decimal point indicator that may be set.

6. In a calculating machine having a multiplicand key board comprising rows of digit keys, a register carriage with numeral dials, a carriage shifting device to impart step by step movement to the carriage, differential actuators for the numeral dials under control of the multiplicand key board, cyclic drive means for the actuators, multiplier keys sequentially operated to control multi-cyclic operation of the actuators followed by operation of the carriage shifting device; the combination of individual decimal point indicators for the register dials, settable to indicating position, decimal point means on said key board denoting the fixed decimal point position thereon and thereby the fixed decimal order values of the rows of digit keys and of the actuators for the register dials controlled thereby, a setting device for the decimal point indicators settable to effective position in which it sets the indicators, in succession, to indicating position upon step by step movement of the register carriage, said setting device being aligned with the decimal point position of the key board and in operative relation with the indicator that occupies the decimal point position in the dial actuators, a key to set the setting device in effective position, means associated with said indicators and effective upon an indicator being set to indicating position, to cause resetting of the adjacent indicator to non-indicating position, a single multiplier decimal point key operable in its proper sequence when the multiplier digit keys are operated for multiplying operation, and means under control of the multiplier decimal point key to set the setting device for the decimal point indicators to ineffective position.

RICHARD V. REPPERT.

References Cited in the file of this patent

UNITED STATES PATENTS

| Number | Name | Date |
|---|---|---|
| 809,075 | Rechnitzer | Jan. 2, 1906 |
| 1,503,742 | Bacon | Aug. 5, 1924 |
| 1,799,037 | Bley | Mar. 31, 1931 |
| 2,329,190 | Ellerbeck | Sept. 14, 1943 |
| 2,329,218 | Reynolds | Sept. 14, 1943 |
| 2,549,512 | Neumann-Lezius | Apr. 17, 1951 |
| 2,567,133 | Studley | Sept. 4, 1951 |